United States Patent
Kanda et al.

(10) Patent No.: US 12,273,023 B2
(45) Date of Patent: Apr. 8, 2025

(54) ACTIVE SNUBBER CIRCUIT AND BUCK CONVERTER

(71) Applicant: YAZAKI CORPORATION, Tokyo (JP)

(72) Inventors: Keisuke Kanda, Susono (JP); Koichi Ushitani, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 262 days.

(21) Appl. No.: 18/298,325

(22) Filed: Apr. 10, 2023

(65) Prior Publication Data

US 2023/0369967 A1   Nov. 16, 2023

(30) Foreign Application Priority Data

May 11, 2022   (JP) .................................. 2022-077967

(51) Int. Cl.
   *H02M 1/34*   (2007.01)
   *H02M 3/158*   (2006.01)
   *H02M 3/335*   (2006.01)

(52) U.S. Cl.
   CPC ........... *H02M 1/342* (2021.05); *H02M 3/158* (2013.01); *H02M 3/33573* (2021.05)

(58) Field of Classification Search
   CPC .................................. H02M 1/32; H02M 1/34
   See application file for complete search history.

(56) References Cited

U.S. PATENT DOCUMENTS

| 2012/0086417 A1* | 4/2012 | Osada ..................... B60L 3/003 323/282 |
| 2020/0153350 A1* | 5/2020 | Yoshimitsu ....... H02M 3/33592 |

FOREIGN PATENT DOCUMENTS

JP   2020-182281 A   11/2020

OTHER PUBLICATIONS

Aow-Ming Chen, Sheng-Yu Tseng, Cheng-Tao Tsai and Tsai-Fu Wu, "Interleaved buck converters with a single-capacitor turn-off snubber," in IEEE Transactions on Aerospace and Electronic Systems, vol. 40, No. 3, pp. 954-967, Jul. 2004 (Year: 2004).*
A. Elasser and D. A. Torrey, "Soft switching active snubbers for DC/DC converters," in IEEE Transactions on Power Electronics, vol. 11, No. 5, pp. 710-722, Sep. 1996 (Year: 1996).*

* cited by examiner

*Primary Examiner* — Peter M Novak
(74) *Attorney, Agent, or Firm* — KENEALY VAIDYA LLP (57) ABSTRACT

An active snubber circuit is connected to a buck converter and decreases a first surge voltage and a second surge voltage generated by the buck converter. The active snubber circuit includes a first FET switch connected to the output point of the first surge voltage and a first power storage element, a second FET switch connected to the output point of the second surge voltage and a second power storage element, an inductor connected to a connection point positioned on an output side with respect to the output point of the second surge voltage, the first and second FET switches, and an element connected to the first and second FET switches, the inductor, and ground and through which a forward current flows.

6 Claims, 5 Drawing Sheets

PERIOD 1

ACTIVE SNUBBER CIRCUIT AND BUCK CONVERTER

CROSS-REFERENCE TO RELATED APPLICATIONS

This application is based on and claims priority under 35 USC 119 from Japanese Patent Application No. 2022-077967 filed on May 11, 2022, the contents of which are incorporated herein by reference.

TECHNICAL FIELD

The present disclosure relates to an active snubber circuit and a buck converter.

BACKGROUND ART

A power conversion device including a first active snubber circuit and a second active snubber circuit that reduce surge voltages of first to fourth switches of a full-bridge circuit is known (for example, see JP2020-182281A). The first active snubber circuit is connected in parallel with the second switch, and the second active snubber circuit is connected in parallel with the fourth switch.

In the power conversion device disclosed in JP2020-182281A, the same number of active snubber circuits as the number of generation sources of the surge voltages are required. Therefore, as the generation sources of the surge voltages are increased, the number of components that constitute the active snubber circuit is increased, and the active snubber circuit is large in scale. Further, since a plurality of active snubber circuits are provided independently of one another, switching of the active snubber circuit needs to be hard switching, and switching loss increases in a continuous mode.

SUMMARY OF INVENTION

The present disclosure provides an active snubber circuit and a buck converter that can decrease a surge voltage by the active snubber circuit having a small-scale configuration and that can reduce switching loss in the buck converter including a plurality of outputs and a plurality of generation sources of surge voltages.

According to the present disclosure, an active snubber circuit is connected to a buck converter and decreases a first surge voltage and a second surge voltage. The buck converter includes a first circuit that bucks an input voltage and that generates the first surge voltage and a second circuit that includes a plurality of outputs and that generates the second surge voltage. The active snubber circuit includes a first power storage element connected to an output point of the first surge voltage of the first circuit, a first FET switch connected to the output point of the first surge voltage of the first circuit and the first power storage element, a second power storage element connected to an output point of the second surge voltage of the second circuit, a second FET switch connected to the output point of the second surge voltage of the second circuit and the second power storage element, an inductor connected to a connection point, the first FET switch, and the second FET switch, the connection point positioned on an output side with respect to the output point of the second surge voltage of the second circuit, and an element that is connected to the first FET switch, the second FET switch, the inductor, and ground and through which a forward current flows.

According to the present disclosure, a buck converter includes a first circuit that bucks an input voltage and that generates a first surge voltage, a second circuit that includes a plurality of outputs and that generates a second surge voltage, an active snubber circuit that is connected to the first circuit and the second circuit and that decreases the first surge voltage and the second surge voltage, and a control unit configured to control a first FET switch and a second FET switch. The active snubber circuit includes a first power storage element connected to an output point of the first surge voltage of the first circuit, the first FET switch connected to the output point of the first surge voltage of the first circuit and the first power storage element, a second power storage element connected to an output point of the second surge voltage of the second circuit, the second FET switch connected to the output point of the second surge voltage of the second circuit and the second power storage element, an inductor connected to a connection point, the first FET switch, and the second FET switch, the connection point positioned on an output side with respect to the output point of the second surge voltage of the second circuit, and an element that is connected to the first FET switch, the second FET switch, the inductor, and ground and through which a forward current flows.

DESCRIPTION OF EMBODIMENTS

Hereinafter, the present disclosure will be described along with preferred embodiments. The present disclosure is not limited to the embodiments shown below, and the embodiments shown below can be appropriately changed within a scope not departing from the spirit of the present disclosure.

Further, in the embodiments shown below, although there are portions where illustrations and descriptions of some configurations are omitted, it goes without saying that for details of omitted techniques, publicly known or well-known techniques are appropriately applied within a range that does not cause contradiction with contents described below.

Figure 1:
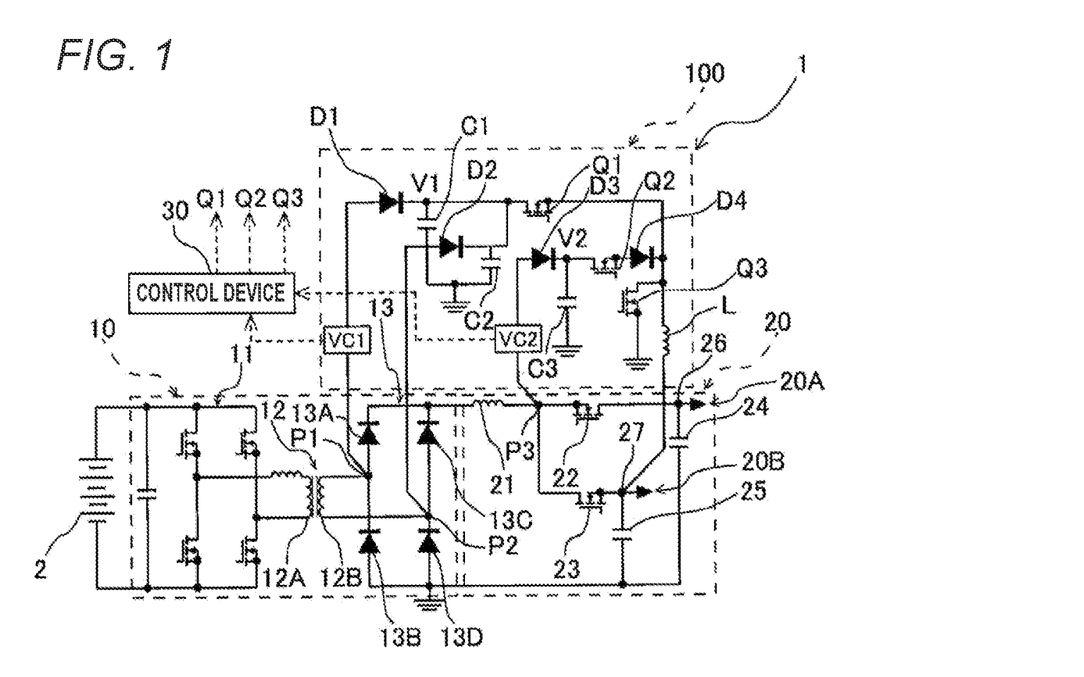
FIG. 1 is a circuit diagram showing a buck converter according to an embodiment of the present disclosure.

FIG. 1 is a circuit diagram showing a buck converter 1 according to the embodiment of the present disclosure. The buck converter 1 shown in FIG. 1 includes a plurality of outputs. The buck converter 1 includes an insulated DC/DC converter 10, a single inductor multi output (SIMO) DC/DC switching power supply circuit 20, a control device 30, and an active snubber circuit 100.

The insulated DC/DC converter 10 includes a switching circuit 11, a transformer 12, and a rectifier circuit 13. The switching circuit 11 is a full-bridge switching circuit. Four switches of the switching circuit 11 are metal oxide semiconductor field effect transistors (MOSFETs). The four switches may be transistor switches other than the MOSFETs.

The transformer 12 includes a primary-side coil 12A and a secondary-side coil 12B. The primary-side coil 12A is connected to the switching circuit 11, and the secondary-side coil 12B is connected to the rectifier circuit 13. A ratio of the number of turns between the primary-side coil 12A and the secondary-side coil 12B is set such that a voltage is bucked in the transformer 12.

In the switching circuit 11, pulse width modulation (PWM) control of the four switches is performed such that a forward alternating voltage is generated on a secondary side of the transformer 12. Accordingly, a direct-current voltage output from a battery 2 is converted into an alternating-current voltage, is bucked, and is output to the rectifier circuit 13.

The rectifier circuit 13 includes four diodes 13A, 13B, 13C, and 13D, rectifies an alternating current output from the secondary-side coil 12B into a direct current, and outputs the direct current to the DC/DC switching power supply circuit 20. In the rectifier circuit 13, the diode 13A and the diode 13B are connected in series, and the diode 13C and the diode 13D are connected in series. Further, the diodes 13A and 13B and the diodes 13C and 13D are connected in parallel.

An anode of the diode 13A is connected to one end of the secondary-side coil 12B, and an anode of the diode 13C is connected to the other end of the secondary-side coil 12B. Further, a cathode of the diode 13A and a cathode of the diode 13C are connected to one end of an inductor 21 described later.

Anodes of the diodes 13B and 13D are connected to capacitors 24 and 25 described later. Further, a cathode of the diode 13B is connected to one end of the secondary-side coil 12B, and a cathode of the diode 13D is connected to the other end of the secondary-side coil 12B.

The DC/DC switching power supply circuit 20 can output two powers having different voltages from the single inductor 21. The DC/DC switching power supply circuit 20 includes a first output system 20A and a second output system 20B. In the present embodiment, the first output system 20A is on a high voltage side, and the second output system 20B is on a low voltage side. The first output system 20A includes a first switch 22 and the capacitor 24. Further, the second output system 20B includes a second switch 23 and a capacitor 25.

The first switch 22 and the second switch 23 according to the present embodiment are enhancement N-channel MOSFETs. The first switch 22 and the second switch 23 may be MOSFETs other than the enhancement N-channel MOSFETs, or transistor switches other than the MOSFETs. A source of the first switch 22 and a drain of the second switch 23 are connected to each other, and connected to the other end of the inductor 21. Further, a drain of the first switch 22 is connected to a first output terminal 26 and the capacitor 24, and a source of the second switch 23 is connected to a second output terminal 27 and the capacitor 25.

The capacitors 24 and 25 are connected to the diodes 13B and 13D and grounded. The capacitor 24 smooths a direct-current voltage output from the first output system 20A. Further, the capacitor 25 smooths a direct-current voltage output from the second output system 20B.

The active snubber circuit 100 is a protective circuit to which a surge voltage generated in the insulated DC/DC converter 10 and a surge voltage generated in the DC/DC switching power supply circuit 20 are input and which decreases these surge voltages. The active snubber circuit 100 includes diodes D1, D2, D3, and D4, capacitors C1, C2, and C3, an inductor L, and FET switches Q1, Q2, and Q3. The FET switches Q1, Q2, and Q3 are enhancement N-channel MOSFETs. The FET switches Q1, Q2, and Q3 may be MOSFETs other than the enhancement N-channel MOSFETs, or FETs other than the MOSFETs.

Anodes of the diodes D1 and D2 are connected to the rectifier circuit 13. Specifically, the anode of the diode D1 is connected to a connection point P1 among the anode of the diode 13A, the cathode of the diode 13B, and one end of the secondary-side coil 12B. Further, the anode of the diode D2 is connected to a connection point P2 among the anode of the diode 13C, the cathode of the diode 13D, and the other end of the secondary-side coil 12B. The surge voltage generated in the insulated DC/DC converter 10 is input from the rectifier circuit 13 to the active snubber circuit 100 via the diodes D1 and D2.

Cathodes of the diodes D1 and D2 are connected to a drain of the FET switch Q1. Further, the capacitors C1 and C2 are grounded. A non-grounded side of the capacitor C1 is connected to a cathode of the diode D1 and the drain of the FET switch Q1. A non-grounded side of the capacitor C2 is connected to a cathode of the diode D2 and the drain of the FET switch Q1. Further, a source of the FET switch Q1 is connected to one end of the inductor L and a drain of the FET switch Q3.

An anode of the diode D3 is connected to the DC/DC switching power supply circuit 20. Specifically, the anode of the diode D3 is connected to a connection point P3 among the inductor 21, the first switch 22, and the second switch 23. The surge voltage generated in the DC/DC switching power supply circuit 20 is input from the DC/DC switching power supply circuit 20 to the active snubber circuit 100 via the diode D3.

A cathode of the diode D3 is connected to a drain of the FET switch Q2. Further, the capacitor C3 is grounded. A non-grounded side of the capacitor C3 is connected to the cathode of the diode D3 and the drain of the FET switch Q2. Further, a source of the FET switch Q2 is connected to an anode of the diode D4. A cathode of the diode D4 is connected to one end of the inductor L and the drain of the FET switch Q3.

A source of the FET switch Q3 is connected to ground. The FET switch Q3 cuts off a connection between the drain and the source in an OFF state, and allows a current to flow in a forward direction by performing conduction between the drain and the source in an ON state. Further, the other end of the inductor L is connected to the second output terminal 27 of the DC/DC switching power supply circuit 20. When voltages of the first output system 20A and the second output system 20B are the same, the other end of the inductor L may be connected to the first output terminal 26.

The active snubber circuit 100 is provided with voltage sensors VC1 and VC2. The voltage sensor VC1 measures the surge voltage input from the insulated DC/DC converter 10 to the active snubber circuit 100, and outputs a measurement signal to the control device 30. Further, the voltage sensor VC2 measures the surge voltage input from the DC/DC switching power supply circuit 20 to the active snubber circuit 100, and outputs a measurement signal to the control device 30.

In addition to the switching control of the insulated DC/DC converter 10 and the DC/DC switching power supply circuit 20, the control device 30 executes ON/OFF control of the FET switches Q1, Q2, and Q3 of the active snubber circuit 100. Specifically, the control device 30 stores thresholds of the surge voltages measured by the voltage sensors VC1 and VC2, and causes the active snubber circuit 100 to operate when a surge voltage equal to or higher than a threshold is measured by at least one of the voltage sensors VC1 and VC2. Hereinafter, control of the active snubber circuit 100 will be described.

Figure 2A:
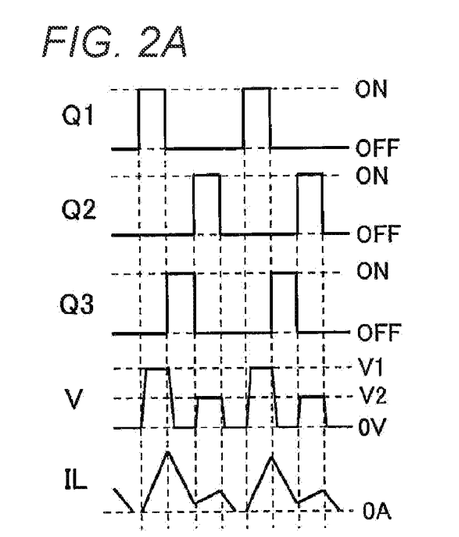
FIG. 2A is a sequence diagram showing ON/OFF of switches of an active snubber circuit, an applied voltage of an inductor, and a current of a transformer in a discontinuous mode.
Figure 2B:
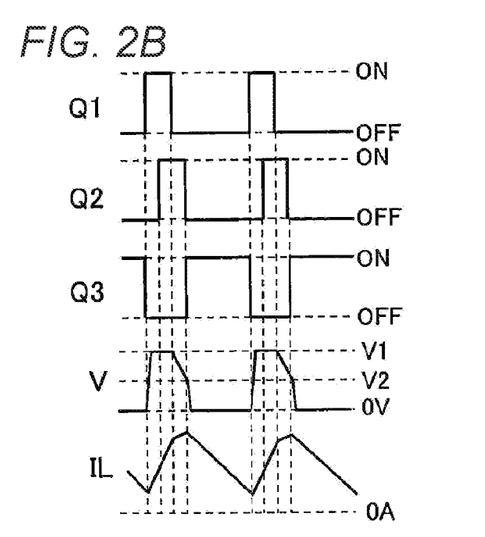
FIG. 2B is a sequence diagram showing ON/OFF of the switches of the active snubber circuit, an applied voltage of the inductor, and a current of the transformer in a continuous mode.

FIG. 2A is a sequence diagram showing ON/OFF of the FET switches Q1, Q2, and Q3 of the active snubber circuit 100, an applied voltage V of the inductor L, and a current IL of the transformer 12 in a discontinuous mode. FIG. 2B is a sequence diagram showing the ON/OFF of the FET switches Q1, Q2, and Q3 of the active snubber circuit 100, the applied voltage V of the inductor L, and the current IL of the transformer 12 in a continuous mode.

As shown in FIG. 2A, the control device 30 (see FIG. 1) controls the high-side FET switches Q1 and Q2 such that ON times do not overlap with each other in the discontinuous mode. That is, the control device 30 turns on/off the FET switch Q1 in a period in which the FET switch Q2 is turned off, and turns on/off the FET switch Q2 in a period in which the FET switch Q1 is turned off in the discontinuous mode. Further, the control device 30 turns on the low-side FET switch Q3 in a period in which the high-side FET switches Q1 and Q2 are turned off, and turns off the low-side FET switch Q3 in a period in which the high-side FET switches Q1 and Q2 are turned on in the discontinuous mode.

Here, when a voltage applied to the FET switch is Vds and a current that flows through the FET switch is Ids, switching loss of the FET switch is about $\frac{1}{6} \times Vds \times Ids$. Therefore, if the FET switch is switched when the current Ids that flows through the FET switch is 0 A, the switching loss of the FET switch is 0 W.

Therefore, in the present embodiment, in the discontinuous mode, the control device 30 turns on the high-side FET switches Q1 and Q2 at a timing at which the current IL of the transformer 12 is 0 A or close to 0 A. For example, as shown in FIG. 2A, the control device 30 (see FIG. 1) turns on the FET switch Q1 at a timing at which the current IL of the transformer 12 is 0 A, and turns on the FET switch Q2 at a timing at which the current IL of the transformer 12 drops to near 0 A.

On the other hand, as shown in FIG. 2B, the control device 30 (see FIG. 1) controls the high-side FET switches Q1 and Q2 such that a part of ON time of the FET switch Q1 and a part of ON time of the FET switch Q2 overlap with each other in the continuous mode. Specifically, the control device 30 turns on the FET switch Q1 in advance, and turns on the FET switch Q2 in a period in which the FET switch Q1 is turned on in the continuous mode. The control device 30 turns off the FET switch Q1 in a period in which the FET switch Q2 is turned on, and then turns off the FET switch Q2.

That is, the ON/OFF switching of the FET switches Q1 and Q2 in one cycle is repeated by (1) the FET switch Q1: ON, the FET switch Q2: OFF, (2) the FET switch Q1: ON, the FET switch Q2: ON, (3) the FET switch Q1: OFF, the FET switch Q2: ON, and (4) the FET switch Q1: OFF, the FET switch Q2: OFF. Further, the control device 30 turns on the low-side FET switch Q3 in the period in which the high-side FET switches Q1 and Q2 are turned off, and turns off the low-side FET switch Q3 in the period in which the high-side FET switches Q1 and Q2 are turned on in the continuous mode.

Here, as shown in FIGS. 2A and 2B, the applied voltage V of the inductor L increases to V1 by ON of the FET switch Q1, and increases or decreases to V2 by ON of the FET switch Q2. Hereinafter, this point will be described.

Figure 3A:
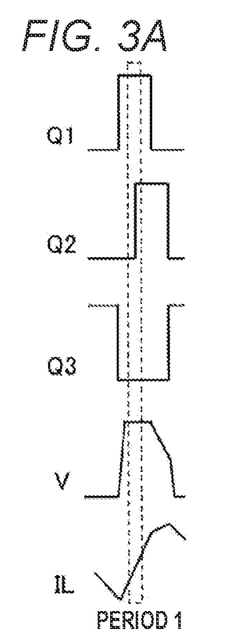
FIG. 3A is a sequence diagram showing ON/OFF of the switches of the active snubber circuit, an applied voltage of the inductor, and a current of the transformer in a period 1 in the continuous mode.
Figure 3B:
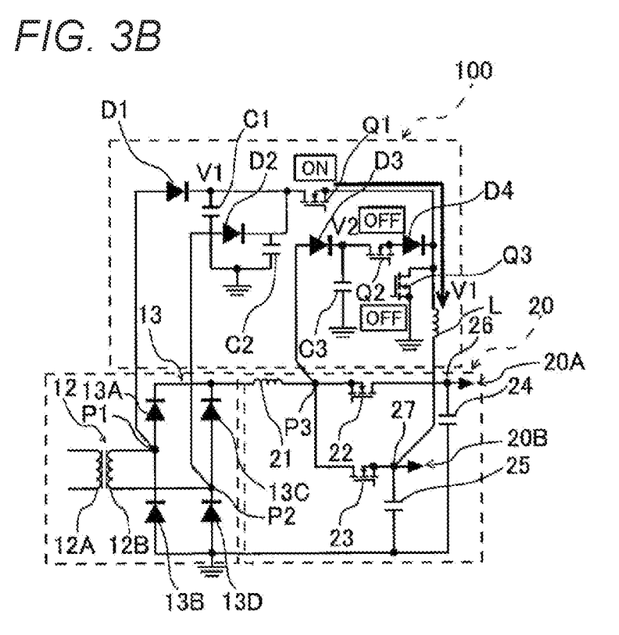
FIG. 3B is a circuit diagram showing an operation of the active snubber circuit at the start of the period 1 in the continuous mode.
Figure 3C:
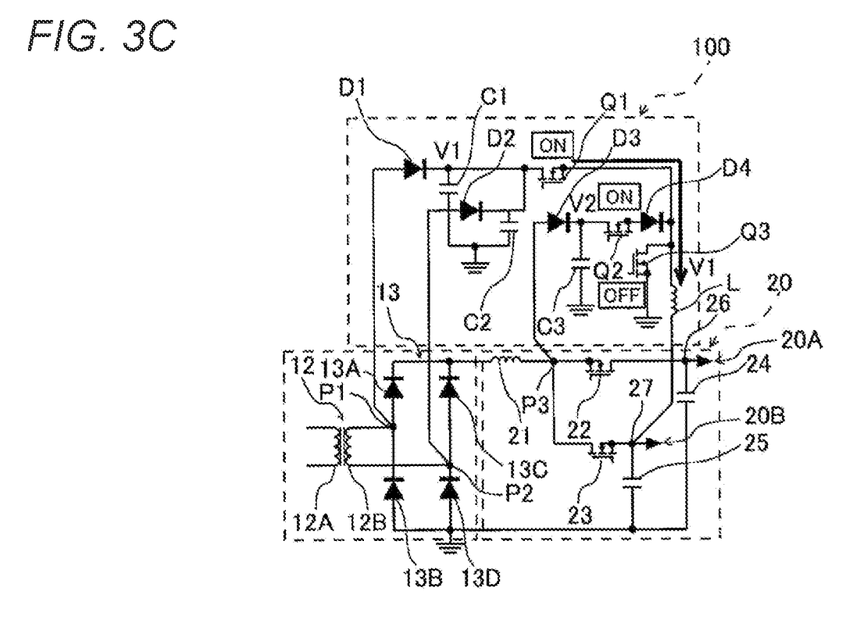
FIG. 3C is a circuit diagram showing an operation of the active snubber circuit at the end of the period 1 in the continuous mode.

FIG. 3A is a sequence diagram showing the ON/OFF of the FET switches Q1, Q2, and Q3 of the active snubber circuit 100, the applied voltage V of the inductor L, and the current IL of the transformer 12 in a period 1 in the continuous mode. FIG. 3B is a circuit diagram showing an operation of the active snubber circuit 100 at the start of period 1 in the continuous mode. FIG. 3C is a circuit diagram showing an operation of the active snubber circuit 100 at the end of the period 1 in the continuous mode.

The period 1 shown in FIG. 3A is a period in which the FET switch Q2 is switched from OFF to ON when the FET switch Q1 is turned on. As shown in FIG. 3B, at the start of the period 1, the FET switch Q1 is turned on and the FET switch Q2 is turned off. At this time, the current is supplied from the FET switch Q1 to the inductor L, and the voltage V1 is applied to the inductor L.

As shown in FIG. 3C, at the end of the period 1, in a state where the FET switch Q1 is turned on, that is, in a state where the current is supplied from the FET switch Q1 to the inductor L and the voltage V1 is applied to the inductor L, the FET switch Q2 is switched from OFF to ON.

Here, since the buck converter 1 is a buck DC/DC converter, at a timing at which the FET switch Q2 is switched from OFF to ON, the voltage V2<the voltage V1. Therefore, at the timing, the current does not flow from the FET switch Q2 to the inductor L, so that the FET switch Q2 becomes soft switching, and no switching loss is generated in the FET switch Q2.

Figure 4A:
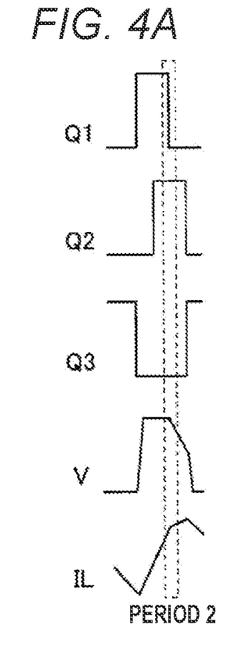
FIG. 4A is a sequence diagram showing ON/OFF of the switches of the active snubber circuit, an applied voltage of the inductor, and a current of the transformer in a period 2 in the continuous mode.
Figure 4B:
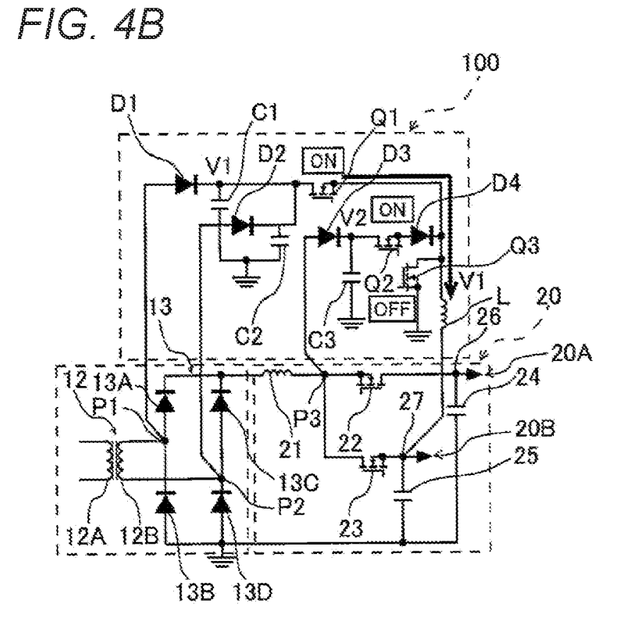
FIG. 4B is a circuit diagram showing an operation of the active snubber circuit at the start of the period 2 in the continuous mode.
Figure 4C:
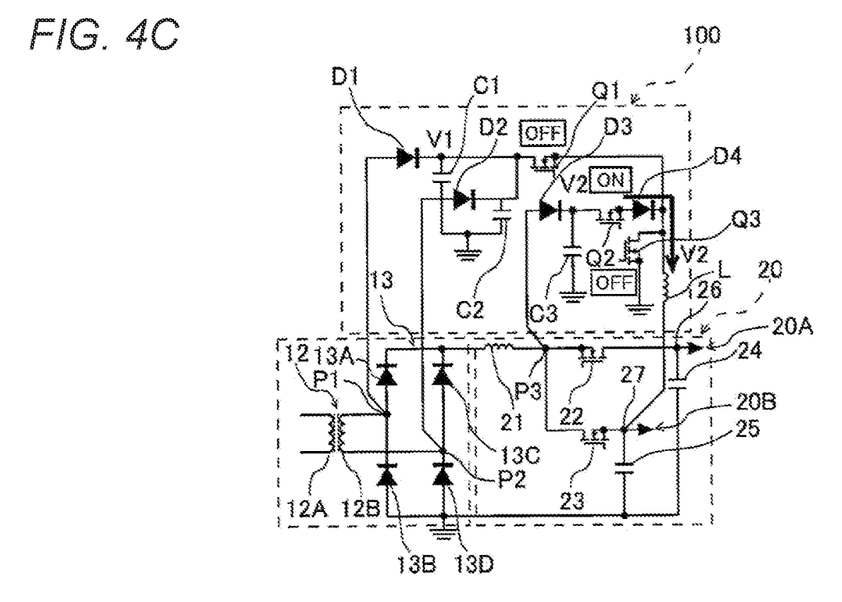
FIG. 4C is a circuit diagram showing an operation of the active snubber circuit at the end of the period 2 in the continuous mode.

FIG. 4A is a sequence diagram showing the ON/OFF of the FET switches Q1, Q2, and Q3 of the active snubber circuit 100, the applied voltage V of the inductor L, and the current IL of the transformer 12 in a period 2 in the continuous mode. FIG. 4B is a circuit diagram showing an operation of the active snubber circuit 100 at the start of the period 2 in the continuous mode. FIG. 4C is a circuit diagram showing an operation of the active snubber circuit 100 at the end of the period 2 in the continuous mode.

The period 2 shown in FIG. 4A is a period in which the FET switch Q1 is switched from ON to OFF when the FET switch Q2 is turned on. As shown in FIG. 4B, at the start of the period 2, the FET switch Q2 is turned on, and the FET switch Q1 is also turned on. At this time, the current is supplied from the FET switch Q1 to the inductor L, and the voltage V1 is applied to the inductor L.

As shown in FIG. 4C, at the end of the period 2, in a state where the FET switches Q1 and Q2 are turned on, that is, in a state where the current is supplied from the FET switch Q1 to the inductor L and the voltage V1 is applied to the inductor L, the FET switch Q1 is switched from ON to OFF. At the timing, the current is supplied from the FET switch Q2 to the inductor L.

Here, the voltage V applied to the inductor L at the timing at which the FET switch Q1 is switched from ON to OFF is changed from V1 to V2. Therefore, at the timing, a voltage fluctuation that causes the switching loss of the FET switch Q1 is (V1−V2). A width of the voltage fluctuation (V1−V2) is smaller than that of a voltage fluctuation (V1−0) generated in a buck converter 1C (see FIG. 5) according to a comparative example described later.

Figure 5:
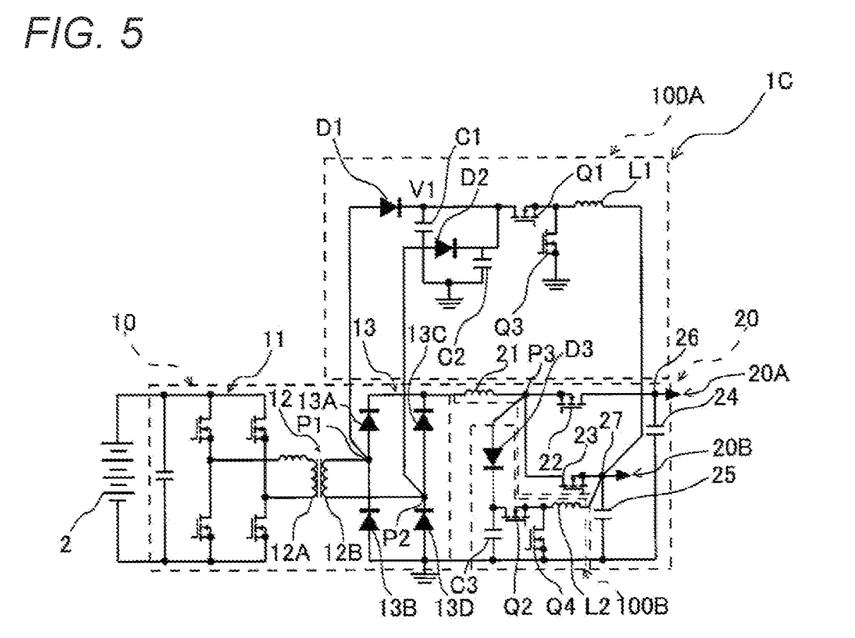
FIG. 5 is a circuit diagram showing a buck converter according to a comparative example.

FIG. 5 is a circuit diagram showing the buck converter 1C according to the comparative example. As shown in FIG. 5, the buck converter 1C according to the comparative example includes a first active snubber circuit 100A and a second active snubber circuit 100B. The first active snubber circuit 100A can decrease the surge voltage generated in the insulated DC/DC converter 10. On the other hand, the second active snubber circuit 100B can decrease the surge voltage generated in the DC/DC switching power supply circuit 20.

That is, in the buck converter 1C according to the comparative example, the first active snubber circuit 100A for the insulated DC/DC converter 10 and the second active snubber circuit 100B for the DC/DC switching power supply circuit 20 are provided independently of each other. Therefore, in the buck converter 1C according to the comparative example, at the end of the period 2 in the continuous mode, the voltage V applied to the inductor L at the timing at which the FET switch Q1 is switched from ON to OFF is changed from V1 to 0. Therefore, at the timing, the voltage fluctuation that causes the switching loss of the FET switch Q1 is (V1−0), and a width of the voltage fluctuation (V1−0) is larger than that of a voltage fluctuation (V1−V2) generated in the buck converter 1 according to the present embodiment.

In addition, in the buck converter 1C according to the comparative example, the first active snubber circuit 100A for the insulated DC/DC converter 10 includes the inductor L1 and the low-side FET switch Q3, and the second active snubber circuit 100B for the DC/DC switching power supply circuit 20 includes the inductor L2 and a low-side FET switch Q4. Therefore, the buck converter 1C according to the comparative example has a larger number of components of the active snubber circuit than that of the buck converter 1 according to the present embodiment, and is inferior in terms of a size and a cost.

As described above, in the buck converter 1 according to the present embodiment, the active snubber circuit 100 includes a plurality of input units of the surge voltages. The surge voltages are input from the insulated DC/DC converter 10 that is a generation source of a first surge voltage and the DC/DC switching power supply circuit 20 that is a generation source of a second surge voltage to the active snubber circuit 100. The active snubber circuit 100 can decrease the first and second surge voltages by the common inductor L and the common low-side FET switch (FET switch Q3). Accordingly, as compared with the buck converter 1C according to the comparative example described above, the number of components of the active snubber circuit 100 can be reduced, and superiority is high in terms of the size and the cost.

One of the FET switches Q1 and Q2 (FET switch Q1) connected to the inductor L is connected to the connection points P1 and P2 of the insulated DC/DC converter 10 that is the generation source of the relatively high surge voltage. On the other hand, the other of the FET switches Q1 and Q2 (FET switch Q2) connected to the inductor L is connected to the DC/DC switching power supply circuit 20 that is the generation source of the relatively low surge voltage. Accordingly, not only in the discontinuous mode, but also in the continuous mode, the switching loss of the FET switches Q1 and Q2 can be reduced as compared with the buck converter 1C according to the comparative example described above.

Specifically, the control device 30 controls the FET switches Q1 and Q2 as follows in the discontinuous mode, so that the switching loss of the FET switches Q1 and Q2 in the discontinuous mode can be reduced. First, the FET switch Q1 is switched to ON from a state where the FET switches Q1 and Q2 are turned off. Next, the FET switch Q1 is switched to OFF in a state where the FET switch Q2 is turned off. Next, the FET switch Q2 is switched to ON in a state where the FET switch Q1 is turned off. Next, the FET switch Q2 is switched to OFF in a state where the FET switch Q1 is turned off. Accordingly, in a state where the current that flows through the FET switches Q1 and Q2 is 0 or close to 0, the FET switches Q1 and Q2 can be switched to ON, and the switching loss of the FET switches Q1 and Q2 can be reduced.

On the other hand, the control device 30 controls the FET switches Q1 and Q2 as follows in the continuous mode, so that the switching loss of the FET switches Q1 and Q2 in the continuous mode can be reduced. First, the FET switch Q1 is switched to ON from a state where the FET switches Q1 and Q2 are turned off. Next, the FET switch Q2 is switched to ON in a state where the FET switch Q1 is turned on. Next, the FET switch Q1 is switched to OFF in a state where the FET switch Q2 is turned on. Next, the FET switch Q2 is switched to OFF in a state where the FET switch Q1 is turned off. Accordingly, the FET switch Q2 can be switched from OFF to ON in a state where the current that flows through the FET switch Q2 is 0, and the switching loss of the FET switch Q2 can be reduced. Further, at the timing at which the FET switch Q1 is switched to OFF, the voltage fluctuation that causes the switching loss of the FET switch Q1 can be suppressed to (V1−V2), and the switching loss of the FET switch Q1 can be reduced.

Figure 6:
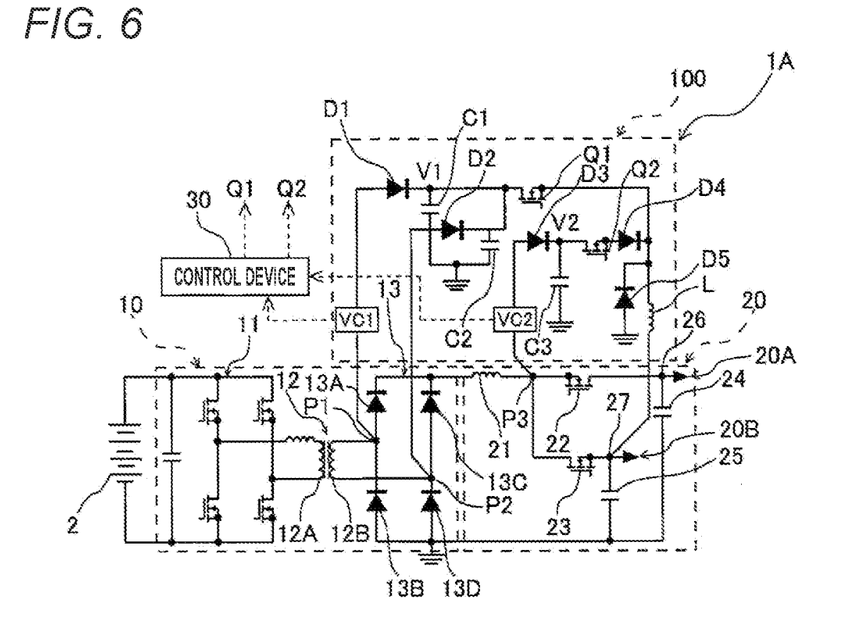
FIG. 6 is a circuit diagram showing a buck converter according to another embodiment of the present disclosure.

FIG. 6 is a circuit diagram showing a buck converter 1A according to another embodiment of the present disclosure. As shown in FIG. 6, the buck converter 1A according to the present embodiment includes a diode D5 instead of using the FET switch Q3 provided in the buck converter 1 according to the embodiment described above. The same reference numerals are assigned to configurations similar to those of the embodiment described above, and description of the embodiment described above is incorporated by reference.

A cathode of the diode D5 is connected to a source of the FET switch Q1 and a cathode of the diode D4, and an anode of the diode D5 is grounded. Here, in a state where at least one of the FET switch Q1 and the FET switch Q2 is turned on, and a current flow from the FET switch Q1 or the FET switch Q2 to the inductor L, the current does not flow to a low side. Therefore, even if the FET switch Q3 provided in the buck converter 1 according to the embodiment described above is replaced with the diode D5, a function of the active snubber circuit 100 is ensured.

Figure 7:
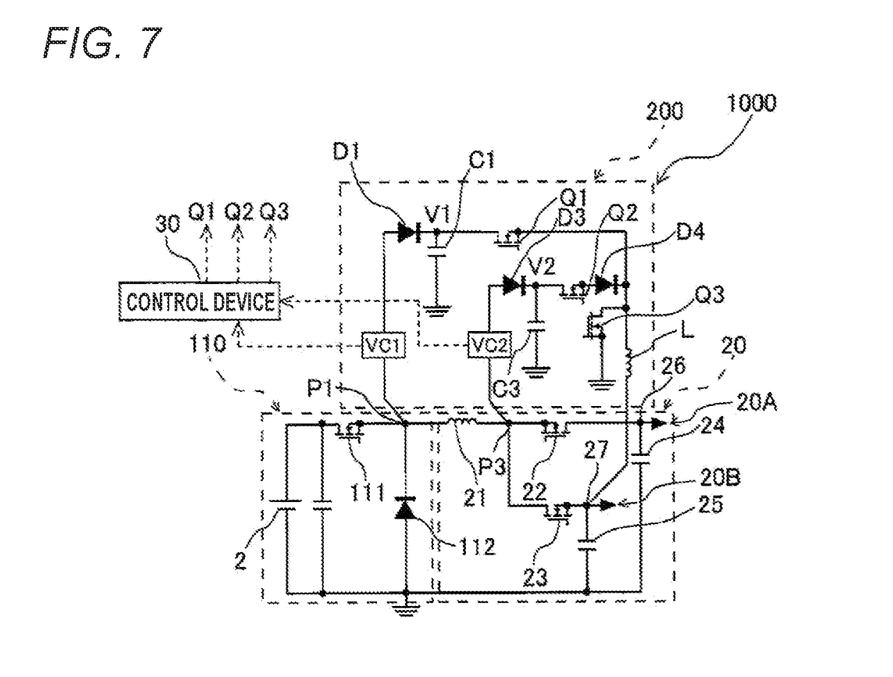
FIG. 7 is a circuit diagram showing a buck converter according to another embodiment of the present disclosure.

FIG. 7 is a circuit diagram showing a buck converter 1000 according to another embodiment of the present disclosure. As shown in FIG. 7, the buck converter 1000 according to the present embodiment includes a plurality of outputs. The buck converter 1000 includes a non-insulated DC/DC converter 110, the DC/DC switching power supply circuit 20, the control device 30, and an active snubber circuit 200. The same reference numerals are assigned to configurations similar to those of the embodiment described above, and description of the embodiment described above is incorporated by reference.

The non-insulated DC/DC converter 110 includes a switch 111 and a diode 112. The switch 111 is an enhancement N-channel MOSFET. The switch 111 may be a MOSFET other than the enhancement N-channel MOSFET, or a transistor switch other than the MOSFET. Further, an anode of the diode 112 is grounded, and a cathode of the diode 112 is connected to a source of the switch 111 and the inductor 21.

In the non-insulated DC/DC converter 110, under control of the switch 111, a direct-current voltage output from a battery 2 is bucked and output to the DC/DC switching power supply circuit 20.

The active snubber circuit 200 is a protective circuit to which a surge voltage generated in the non-insulated DC/DC converter 110 and a surge voltage generated in the DC/DC switching power supply circuit 20 are input and which decreases these surge voltages. The active snubber circuit 200 includes the diodes D1, D3, and D4, the capacitors C1 and C3, the inductor L, and the FET switches Q1, Q2, and Q3.

An anode of the diode D1 is connected to the non-insulated DC/DC converter 110. Specifically, the anode of the diode D1 is connected to a connection point P1 among the cathode of the diode 112, the source of the switch 111, and the inductor 21. The surge voltage generated in the non-insulated DC/DC converter 110 is input from the non-insulated DC/DC converter 110 to the active snubber circuit 200 via the diode D1.

A cathode of the diode D1 is connected to a drain of the FET switch Q1. Further, the capacitor C1 is grounded. A non-grounded side of the capacitor C1 is connected to the cathode of the diode D1 and the drain of the FET switch Q1. Further, a source of the FET switch Q1 is connected to one end of the inductor L and a drain of the FET switch Q3.

An anode of the diode D3 is connected to the DC/DC switching power supply circuit 20. Specifically, the anode of the diode D3 is connected to a connection point P3 among the inductor 21, the first switch 22, and the second switch 23. The surge voltage generated in the DC/DC switching power supply circuit 20 is input from the DC/DC switching power supply circuit 20 to the active snubber circuit 200 via the diode D3.

A cathode of the diode D3 is connected to a drain of the FET switch Q2. Further, the capacitor C3 is grounded. A non-grounded side of the capacitor C3 is connected to the cathode of the diode D3 and the drain of the FET switch Q2. Further, a source of the FET switch Q2 is connected to one end of the inductor L and the drain of the FET switch Q3.

The active snubber circuit 200 is provided with the voltage sensors VC1 and VC2. The voltage sensor VC1 measures the surge voltage input from the non-insulated DC/DC converter 110 to the active snubber circuit 200, and outputs a measurement signal to the control device 30. Further, the voltage sensor VC2 measures the surge voltage input from the DC/DC switching power supply circuit 20 to the active snubber circuit 200, and outputs a measurement signal to the control device 30.

In addition to the switching control of the non-insulated DC/DC converter 110 and the DC/DC switching power supply circuit 20, the control device 30 executes ON/OFF control of the FET switches Q1, Q2, and Q3 of the active snubber circuit 200. The ON/OFF control of the FET switches Q1, Q2, and Q3 of the active snubber circuit 200 performed by the control device 30 is similar to that of the embodiments described above.

The present disclosure has been described above based on the above-described embodiments, but the present disclosure is not limited to the embodiments described above, and modifications may be made to the embodiments described above, and publicly known or well-known techniques may be appropriately combined within a scope not departing from the spirit of the present disclosure.

For example, the SIMO DC/DC switching power supply circuit 20 is set as an example of the generation source of the second surge voltage in the embodiments described above, but a multi-phase DC/DC converter or the like can also be exemplified as the generation source of the second surge voltage.

According to a first aspect of the present disclosure, an active snubber circuit (100, 200) is connected to a buck converter (1, 1A) and decreases a first surge voltage and a second surge voltage. The buck converter (1, 1A) includes a first circuit (10, 110) that bucks an input voltage and that generates the first surge voltage and a second circuit (20) that includes a plurality of outputs and that generates the second surge voltage. The active snubber circuit (100, 200) includes a first power storage element (C1, C2) connected to an output point of the first surge voltage (P1, P2) of the first circuit (10, 110), a first FET switch (Q1) connected to the output point of the first surge voltage (P1, P2) of the first circuit (10, 110) and the first power storage element (C1, C2), a second power storage element (C3) connected to an output point of the second surge voltage (P3) of the second circuit (20), a second FET switch (Q2) connected to the output point of the second surge voltage (P3) of the second circuit (20) and the second power storage element (C3), an inductor (L) connected to a connection point (27), the first FET switch (Q1), and the second FET switch (Q2), the connection point (27) positioned on an output side with respect to the output point of the second surge voltage (P3) of the second circuit (20), and an element (Q3, D5) that is connected to the first FET switch (Q1), the second FET switch (Q2), the inductor (L), and ground and through which a forward current flows.

According to a second aspect of the present disclosure, a buck converter (1, 1A) includes a first circuit (10, 110) that bucks an input voltage and that generates a first surge voltage, a second circuit (20) that includes a plurality of outputs and that generates a second surge voltage, an active snubber circuit (100, 200) that is connected to the first circuit (10, 110) and the second circuit (20) and that decreases the first surge voltage and the second surge voltage, and a control unit (30) configured to control a first FET switch (Q1) and a second FET switch (Q2). The active snubber circuit (100, 200) includes a first power storage element (C1, C2) connected to an output point of the first surge voltage (P1, P2) of the first circuit (10, 110), the first FET switch (Q1) connected to the output point of the first surge voltage (P1, P2) of the first circuit (10, 110) and the first power storage element (C1, C2), a second power storage element (C3) connected to an output point of the second surge voltage (P3) of the second circuit (20), the second FET switch (Q2) connected to the output point of the second surge voltage (P3) of the second circuit (20) and the second power storage element (C3), an inductor (L) connected to a connection point (27), the first FET switch (Q1), and the second FET switch (Q2), the connection point (27) positioned on an output side with respect to the output point of the second surge voltage (P3) of the second circuit (20), and an element (Q3, D5) that is connected to the first FET switch (Q1), the second FET switch (Q2), the inductor (L), and ground and through which a forward current flows.

According to a third aspect of the present disclosure, in a continuous mode, the control unit (30) switches the first FET switch (Q1) to ON from a state where the first FET switch (Q1) and the second FET switch (Q2) are turned off, then switches the second FET switch (Q2) to ON in a state where the first FET switch (Q1) is turned on, then switches the first FET switch (Q1) to OFF in a state where the second FET switch (Q2) is turned on, and then switches the second FET switch (Q2) to OFF in a state where the first FET switch (Q1) is turned off.

According to a fourth aspect of the present disclosure, in a discontinuous mode, the control unit (30) switches the first FET switch (Q1) to ON from a state where the first FET switch (Q1) and the second FET switch (Q2) are turned off, then switches the first FET switch (Q1) to OFF in a state where the second FET switch (Q2) is turned off, then switches the second FET switch (Q2) to ON in a state where the first FET switch (Q1) is turned off, and then switches the second FET switch (Q2) to OFF in a state where the first FET switch (Q1) is turned off.

According to a fifth aspect of the present disclosure, the element (Q3, D5) is a third FET switch (Q3) or a diode (D5).

What is claimed is:

1. An active snubber circuit that is connected to a buck converter and that decreases a first surge voltage and a second surge voltage, the buck converter including a first circuit that bucks an input voltage and that generates the first surge voltage and a second circuit that includes a plurality of outputs and that generates the second surge voltage, the active snubber circuit comprising:
    a first power storage element connected to an output point of the first surge voltage of the first circuit;
    a first FET switch connected to the output point of the first surge voltage of the first circuit and the first power storage element;
    a second power storage element connected to an output point of the second surge voltage of the second circuit;
    a second FET switch connected to the output point of the second surge voltage of the second circuit and the second power storage element;
    an inductor connected to a connection point, the first FET switch, and the second FET switch, the connection point positioned on an output side with respect to the output point of the second surge voltage of the second circuit; and
    an element that is connected to the first FET switch, the second FET switch, the inductor, and ground and through which a forward current flows.

2. A buck converter comprising:
    a first circuit that bucks an input voltage and that generates a first surge voltage;
    a second circuit that includes a plurality of outputs and that generates a second surge voltage;
    an active snubber circuit that is connected to the first circuit and the second circuit and that decreases the first surge voltage and the second surge voltage; and
    a control unit configured to control a first FET switch and a second FET switch,
        wherein the active snubber circuit includes:
            a first power storage element connected to an output point of the first surge voltage of the first circuit;
            the first FET switch connected to the output point of the first surge voltage of the first circuit and the first power storage element;
            a second power storage element connected to an output point of the second surge voltage of the second circuit;
            the second FET switch connected to the output point of the second surge voltage of the second circuit and the second power storage element;
            an inductor connected to a connection point, the first FET switch, and the second FET switch, the connection point positioned on an output side with respect to the output point of the second surge voltage of the second circuit; and
            an element that is connected to the first FET switch, the second FET switch, the inductor, and ground and through which a forward current flows.

3. The buck converter according to claim 2, wherein in a continuous mode, the control unit switches the first FET switch to ON from a state where the first FET switch and the second FET switch are turned off, then switches the second FET switch to ON in a state where the first FET switch is turned on, then switches the first FET switch to OFF in a state where the second FET switch is turned on, and then switches the second FET switch to OFF in a state where the first FET switch is turned off.

4. The buck converter according to claim 2, wherein in a discontinuous mode, the control unit switches the first FET switch to ON from a state where the first FET switch and the second FET switch are turned off, then switches the first FET switch to OFF in a state where the second FET switch is turned off, then switches the second FET switch to ON in a state where the first FET switch is turned off, and then switches the second FET switch to OFF in a state where the first FET switch is turned off.

5. The buck converter according to claim 3, wherein in a discontinuous mode, the control unit switches the first FET switch to ON from a state where the first FET switch and the second FET switch are turned off, then switches the first FET switch to OFF in a state where the second FET switch is turned off, then switches the second FET switch to ON in a state where the first FET switch is turned off, and then switches the second FET switch to OFF in a state where the first FET switch is turned off.

6. The buck converter according to claim 2, wherein the element is a third FET switch or a diode.

* * * * *